(12) United States Patent
Nhan et al.

(10) Patent No.: US 12,232,091 B2
(45) Date of Patent: Feb. 18, 2025

(54) DATA TRANSMISSION SLOT INDEXING

(71) Applicant: Nokia Technologies Oy, Espoo (FI)

(72) Inventors: Nhat-Quang Nhan, Reims (FR); Keeth Saliya Jayasinghe Laddu, Espoo (FI); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 392 days.

(21) Appl. No.: 17/765,659

(22) PCT Filed: Sep. 16, 2020

(86) PCT No.: PCT/EP2020/075843
§ 371 (c)(1),
(2) Date: Mar. 31, 2022

(87) PCT Pub. No.: WO2021/063680
PCT Pub. Date: Apr. 8, 2021

(65) Prior Publication Data
US 2022/0386304 A1 Dec. 1, 2022

(30) Foreign Application Priority Data

Oct. 4, 2019 (GB) ..................................... 1914328

(51) Int. Cl.
*H04W 72/0446* (2023.01)
*H04L 1/00* (2006.01)

(52) U.S. Cl.
CPC ....... *H04W 72/0446* (2013.01); *H04L 1/0081* (2013.01)

(58) Field of Classification Search
CPC .. H04W 72/0446; H04W 24/02; H04L 1/0081
See application file for complete search history.

(56) References Cited

U.S. PATENT DOCUMENTS

2006/0221910 A1 10/2006 Narasimha et al.
2011/0107170 A1 5/2011 Park et al.
(Continued)

FOREIGN PATENT DOCUMENTS

| | | |
|---|---|---|
| EP | 2899906 A1 | 7/2015 |
| WO | 2011/150721 A1 | 12/2011 |
| WO | 2019/139405 A1 | 7/2019 |

OTHER PUBLICATIONS

"3rd Generation Partnership Project; Technical Specification Group Radio Access Network; NR; Physical layer procedures for control (Release 15)", 3GPP TS 38.213, V15.5.0, Mar. 2019, pp. 1-104.
(Continued)

*Primary Examiner* — Un C Cho
*Assistant Examiner* — Lalita W Pace
(74) *Attorney, Agent, or Firm* — Barta Jones, PLLC

(57) ABSTRACT

An apparatus, method and computer program is provided comprising: determining a plurality of candidate data transmission slots, wherein each candidate data transmission slot has an index and said plurality of candidate data transmission slots are arranged in an order; setting an index of a current candidate data transmission slot of the plurality to be an incremental increase of an index of a preceding candidate data transmission slot of the plurality in the event that a timing gap between a start of said current candidate data transmission slot and a start of a subsequent candidate data transmission slot of the plurality is greater than a threshold; and setting the index of the current candidate data transmission slot to be equal to the index of the preceding candidate data transmission slot of the plurality in the event that the timing gap is not greater than said threshold.

20 Claims, 15 Drawing Sheets

(56) References Cited

U.S. PATENT DOCUMENTS

| | | |
|---|---|---|
| 2011/0164626 A1* | 7/2011 | Temple ................. H04L 12/407 |
| | | 370/498 |
| 2012/0230216 A1 | 9/2012 | Park et al. |
| 2017/0251456 A1 | 8/2017 | Radulescu et al. |
| 2019/0150142 A1* | 5/2019 | Huang ................. H04W 72/23 |
| | | 370/336 |
| 2019/0268803 A1 | 8/2019 | He et al. |
| 2019/0306841 A1* | 10/2019 | Huang ................. H04L 5/0055 |
| 2020/0351934 A1* | 11/2020 | Khoshnevisan .. H04W 72/1268 |
| 2021/0314100 A1* | 10/2021 | Yeo .................... H04W 72/0453 |

OTHER PUBLICATIONS

"On PDCCH Enhancements for NR URLIC", 3GPP TSG RAN WG1#98, R1-1908436, Agenda: 7.2.6.1, Nokia, Aug. 26-30, 2019, 21 pages.

"3rd Generation Partnership Project; Technical Specification Group Radio Access Network; NR; Physical layer procedures for control (Release 15)", 3GPP TS 38.213, V15.7.0, Sep. 2019, pp. 1-108.

Search Report received for corresponding United Kingdom Patent Application No. 1914328.8, dated Apr. 6, 2020, 3 pages.

International Search Report and Written Opinion received for corresponding Patent Cooperation Treaty Application No. PCT/EP2020/075843, dated Dec. 18, 2020, 13 pages.

\* cited by examiner

DATA TRANSMISSION SLOT INDEXING

RELATED APPLICATION

This application was originally filed as PCT Application No. PCT/EP2020/075843, filed on Sep. 16, 2020, which claims priority from GB Application No. 1914328.8 filed on Oct. 4, 2019, each of which is incorporated herein by reference in its entirety.

FIELD

The present specification relates to data transmission slot indexing.

BACKGROUND

Communications between user devices and network nodes may occur within defined candidate data transmission slots. Mechanisms exist to determine indexing for such candidate data transmissions slots, but there remains scope of further developments in this field.

SUMMARY

In a first aspect, this specification describes an apparatus comprising: at least one processor; and at least one memory including computer program code, the at least one memory and the computer program code configured to, with the at least one processor, cause the apparatus to perform at least the following: determining a plurality of candidate data transmission slots, wherein each candidate data transmission slot has an index and said plurality of candidate data transmission slots are arranged in an order; setting an index of a current candidate data transmission slot of the plurality to be an incremental increase of an index of a preceding candidate data transmission slot of the plurality in the event that a timing gap between a start of said current candidate data transmission slot and a start of a subsequent candidate data transmission slot of the plurality is greater than a threshold; and setting the index of the current candidate data transmission slot to be equal to the index of the preceding candidate data transmission slot of the plurality in the event that the timing gap is not greater than said threshold. The plurality of candidate data transmission slots may be candidate physical downlink shared channel (PDSCH) data transmission slots. Each candidate data transmission slot comprises at least one symbol.

Some embodiments further comprise: setting an index of the subsequent candidate data transmission slot to be an incremental increase of the index of the current candidate data transmission slot of the plurality in the event that the timing gap is not greater than said threshold. In some embodiments, once the index of the current candidate data transmission slot has been set to be equal to the preceding slot, then the index of the subsequent candidate data transmission slot may be automatically increased. In some embodiments, the index of the subsequent candidate data transmission slot may be set to be an incremental increase of the index of the current candidate data transmission slot, but that increment may be implement on a following instruction cycle.

Some embodiments comprise: determining, for one or more of said candidate data transmission slots, whether said timing gap is greater than said threshold.

Some embodiments comprise: receiving configuration data defining said threshold. The threshold may, for example, be dependent, at least in part, on a latency requirement of data traffic towards a user device.

Some embodiments comprise: transmitting data defining the plurality of candidate data transmission slots. The data may, for example, be transmitted from a base station or gNB to a user device (e.g. a UE). The data defining the plurality of candidate data transmission slots may comprise a time domain resource allocation table (TDRA).

Some embodiments comprise: ordering said plurality of candidate data transmission slots. The plurality of candidate data transmission slots may be ordered based on starting symbols of said plurality of candidate data transmission slots.

Some embodiments comprise: setting an index of a first of said plurality of candidate data transmission slots to zero.

In a second aspect, this specification describes a method comprising: determining a plurality of candidate data transmission slots, wherein each candidate data transmission slot has an index and said plurality of candidate data transmission slots are arranged in an order; setting an index of a current candidate data transmission slot of the plurality to be an incremental increase of an index of a preceding candidate data transmission slot of the plurality in the event that a timing gap between a start of said current candidate data transmission slot and a start of a subsequent candidate data transmission slot of the plurality is greater than a threshold; and setting the index of the current candidate data transmission slot to be equal to the index of the preceding candidate data transmission slot of the plurality in the event that the timing gap is not greater than said threshold. The method may comprise receiving and/or transmitting data over an air interface using at least one of said candidate data transmission slots. The plurality of candidate data transmission slots may be candidate physical downlink shared channel (PDSCH) data transmission slots. Each candidate data transmission slot comprises at least one symbol.

Some embodiments comprise: setting an index of the subsequent candidate data transmission slot to be an incremental increase of the index of the current candidate data transmission slot of the plurality in the event that the timing gap is not greater than said threshold. Once the index of the current candidate data transmission slot has been set to be equal to the preceding slot, then the index of the subsequent candidate data transmission slot may be automatically increased. In some embodiments, the index of the subsequent candidate data transmission slot may be set to be an incremental increase of the index of the current candidate data transmission slot, but that increment may be implement on a following instruction cycle.

Some embodiments comprise determining, for one or more of said candidate data transmission slots, whether said timing gap is greater than said threshold.

Some embodiment comprise: receiving configuration data defining said threshold. The threshold may, for example, be dependent, at least in part, on a latency requirement of data traffic towards a user device.

Some embodiments comprise: transmitting data defining the plurality of candidate data transmission slots. The data may, for example, be transmitted from a base station or gNB to a user device (e.g. a UE). The data defining the plurality of candidate data transmission slots may comprise a time domain resource allocation table CDRA).

Some embodiments comprise: ordering said plurality of candidate data transmission slots.

The plurality of candidate data transmission slots may be ordered based on starting symbols of said plurality of candidate data transmission slots.

Some embodiments comprise: setting an index of a first of said plurality of candidate data transmission slots to zero.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes an apparatus comprising: means for determining a plurality of candidate data transmission slots, wherein each candidate data transmission slot has an index and said plurality of candidate data transmission slots are arranged in an order; means for setting an index of a current candidate data transmission slot of the plurality to be an incremental increase of an index of a preceding candidate data transmission slot of the plurality in the event that a timing gap between a start of said current candidate data transmission slot and a start of a subsequent candidate data transmission slot of the plurality is greater than a threshold; and means for setting the index of the current candidate data transmission slot to be equal to the index of the preceding candidate data transmission slot of the plurality in the event that the timing gap is not greater than said threshold. The apparatus may further comprise means for setting an index of the subsequent candidate data transmission slot to be an incremental increase of the index of the current candidate data transmission slot of the plurality in the event that the timing gap is not greater than said threshold. Some embodiments comprise means for determining, for one or more of said candidate data transmission slots, whether said timing gap is greater than said threshold. Some embodiments comprise: means for receiving configuration data defining said threshold. Some embodiments comprise means for transmitting data defining the plurality of candidate data transmission slots. Some embodiments comprise means for ordering said plurality of candidate data transmission slots. Some embodiments comprise means for setting an index of a first of said plurality of candidate data transmission slots to zero.

In a sixth aspect, this specification describes a user device. The user device may comprise an apparatus as described with reference to the first, third or fifth aspects. The user device may implement a method as described with reference to the second aspect.

In a seventh aspect, this specification describes a network element. The network element may comprise an apparatus as described with reference to the first, third or fifth aspects. The network element may implement a method as described with reference to the second aspect.

In an eighth aspect, this specification describes a computer readable medium comprising program instructions stored thereon for performing at least the following: determining a plurality of candidate data transmission slots, wherein each candidate data transmission slot has an index and said plurality of candidate data transmission slots are arranged in an order; setting an index of a current candidate data transmission slot of the plurality to be an incremental increase of an index of a preceding candidate data transmission slot of the plurality in the event that a timing gap between a start of said current candidate data transmission slot and a start of a subsequent candidate data transmission slot of the plurality is greater than a threshold; setting the index of the current candidate data transmission slot to be equal to the index of the preceding candidate data transmission slot of the plurality in the event that the timing gap is not greater than said threshold; and (optionally) setting an index of the subsequent candidate data transmission slot to be an incremental increase of the index of the current candidate data transmission slot of the plurality in the event that the timing gap is not greater than said threshold amount.

In a ninth aspect, this specification describes a computer program comprising instructions for causing an apparatus to perform at least the following: determining a plurality of candidate data transmission slots, wherein each candidate data transmission slot has an index and said plurality of candidate data transmission slots are arranged in an order; setting an index of a current candidate data transmission slot of the plurality to be an incremental increase of an index of a preceding candidate data transmission slot of the plurality in the event that a timing gap between a start of said current candidate data transmission slot and a start of a subsequent candidate data transmission slot of the plurality is greater than a threshold; setting the index of the current candidate data transmission slot to be equal to the index of the preceding candidate data transmission slot of the plurality in the event that the timing gap is not greater than said threshold; and (optionally) setting an index of the subsequent candidate data transmission slot to be an incremental increase of the index of the current candidate data transmission slot of the plurality in the event that the timing gap is not greater than said threshold amount.

BRIEF DESCRIPTION OF THE DRAWINGS

Example embodiments will now be described, by way of non-limiting examples, with reference to the following schematic drawings, in which:

FIGS. 2A and 20B show tangible media, respectively a removable non-volatile memory unit and a Compact Disc (CD) storing computer-readable code which when run by a computer perform operations according to example embodiments.

DETAILED DESCRIPTION

Figure 1:
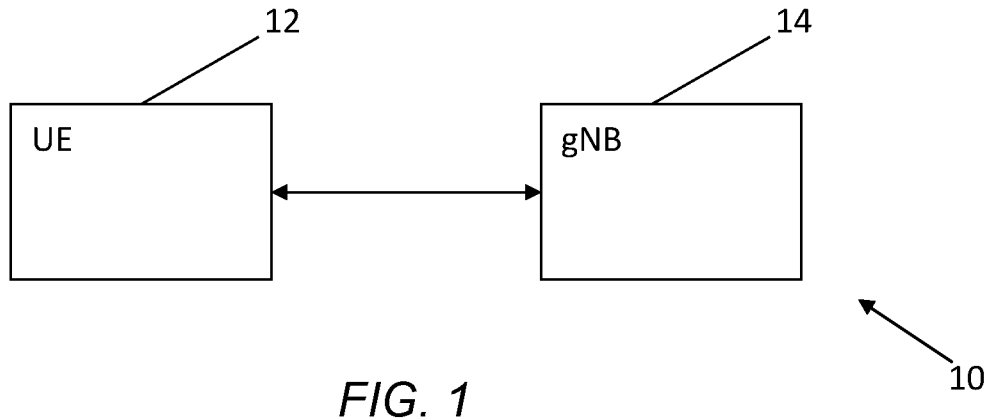
FIG. 1 is a block diagram of a system in accordance with an example embodiment.

The scope of protection sought for various example embodiments of the invention is set out by the independent claims. The example embodiments and features, if any, described in the specification that do not fall under the scope of the independent claims are to be interpreted as examples useful for understanding various example embodiments of the invention.

In the description and drawings, like reference numerals refer to like elements throughout.

FIG. 1 is a block diagram of a system, indicated generally by the reference numeral 10, in accordance with an example embodiment. The system 10 comprises a user device 12 (such as a user equipment (UE)) and a gNB 14 (or some other network node or base station). The user device 12 (which may be one of many user devices) may be in two-way communication with the gNB 14.

Figure 2:
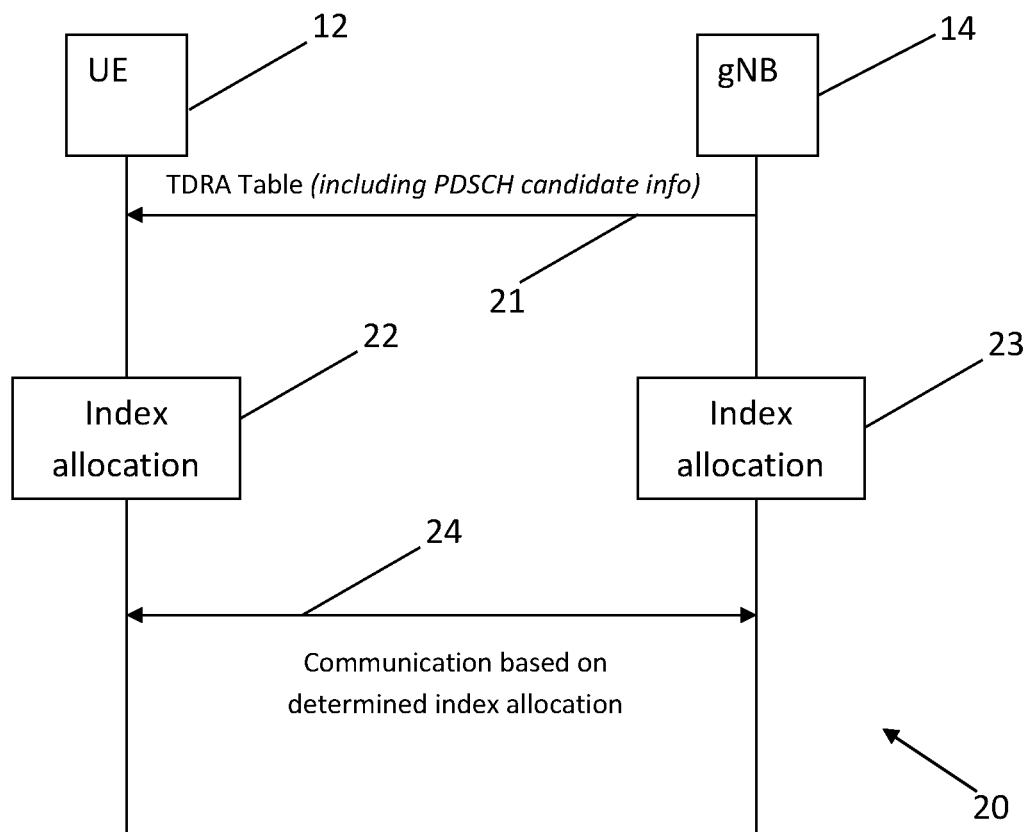
FIG. 2 shows a message sequence in accordance with an example embodiment.

FIG. 2 shows a message sequence, indicated generally by the reference numeral 20, between the user device 12 and the gNB 14, in accordance with an example embodiment.

As described in detail below, the message sequence 20 enables the gNB 14 to provide information (in the form of a time domain resource allocation (TDRA) table, as discussed further below) to the user device 12, identifying a plurality of candidate data transmission (or channel) slots (such as physical downlink shared channel (PDSCH) slots) for communications between the user device and the gNB. The candidate data transmission slots may, for example, be referred to as candidate channel slots (or simply candidate slots) in the description below. Although a candidate channel slot may be used, the proposed method can be applied in case the scheduling unit is frame, subframe, slot, sub-slot and so on.

The message sequence 20 starts at message 21, where information, such as the TDRA table referred to above, is sent from the gNB 14 to the user device 12.

On the basis of the contents of the message 21, the user device 12 performs an index allocation to set an index of each candidate channel (e.g. a PDSCH bit index in HARQ-ACK codebook), as indicated by the function 22. A similar allocation may be carried out at the gNB 14 (indicated by the function 23) such that the TDRA table provided in the message 21 is converted into PDSCH index allocations at both the user device 12 and the gNB 14. It should be noted that the index allocation of the functions 22 and 23 may be implemented in a different way (and could be implemented in different ways from each other).

At message 24 of the message sequence 20, communications may occur between the user device 12 and the gNB 14 based on the determined PDSCH index allocations.

Figure 3:
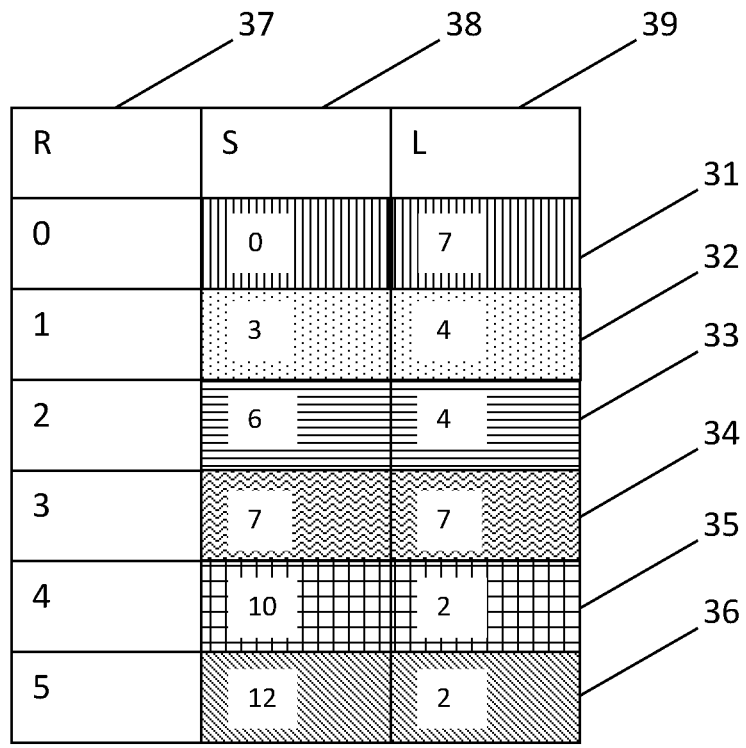
FIG. 3 is a table in accordance with an example embodiment.

FIG. 3 is a table, indicated generally by the reference numeral 30, in accordance with an example embodiment. The table 30 is an example of a TDRA table that may be provided as part of the message 21 of the message sequence 20 described above. The columns of the table 30 represent row indexes 37, starting symbols 38, and lengths 39 of a plurality of candidate data transmission slots (e.g. PDSCH slots). The table includes several rows of data 31 to 36 (of course, more or fewer rows of data could be provided in alternative embodiments). The order of the rows 31 to 36 may indicate ordering of candidate data transmission slots, but this is not essential to all embodiments. In the example table 30, the ordering of the plurality of candidate data transmission slots is based on the starting symbols of the candidate data transmission slots.

As shown in the table 30, the row 31 (represented by a block with a vertical line pattern) has a starting symbol '0', and a length of 7 symbols, the row 32 (represented by a block with a dotted pattern) has a starting symbol '3', and a length of 4 symbols, the row 33 (represented by a block with a horizontal line pattern) has a starting symbol '6', and a length of 4 symbols, the row 34 (represented by a block with a zig-zag line pattern) has a starting symbol '7', and a length of 7 symbols, the row 35 (represented by a block with a chequer pattern) has a starting symbol '10', and a length of 2 symbols, and the row 36 (represented by a block with a diagonal line pattern) has a starting symbol '12', and a length of 2 symbols.

As described in Technical Specification TS 38.213 (V15.7.0) of the 3$^{rd}$ Generation Partnership Project, entitled "NR; Physical later procedures for control", TS 38.213, the TDRA table 30 bit indices for all PDSCH candidates in the relevant codebook can be determined based on the following algorithm:

---
Algorithm 1:
---

Set $\mathcal{C}$(R) to the cardinality of R
Set m to the smallest last OFDM symbol index, as determined by the SLIV, among all rows of
  R
while R≠0
  Set r = 0
  while r < $\mathcal{C}$(R)
    if S ≤ m for start OFDM symbol index S for row r
      $b_{r,k,n_D}$ = j ; - index of occasion for candidate PDSCH reception or SPS PDSCH release
        associated with row r
      R=R\r;
      B = B∪$b_{r,k,n_D}$ ;
    else
      r = r + 1;
    end if
  end while

---

Figure 4:
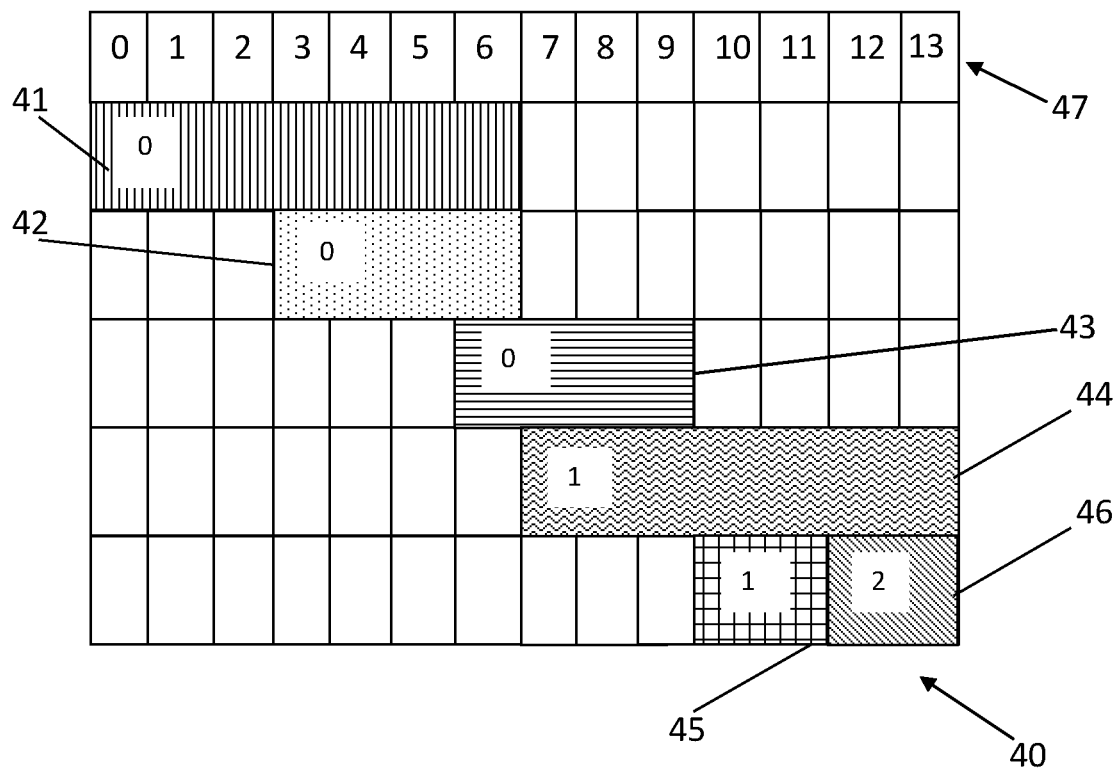
FIG. 4 is a block diagram showing a bit allocation in accordance with an example embodiment.

FIG. 4 is a block diagram, indicated generally by the reference numeral 40, showing a bit allocation in accordance with an example embodiment. More specifically, the block diagram 40 shows bit indices for all PDSCH candidates as defined in the TDRA table 30. FIG. 4 may be viewed in conjunction with the table 30 of FIG. 3 for better understanding.

The block diagram 40 comprises candidate data transmission slots 41 to 46, which are based on the data of the rows 31 to 36 described above respectively. More specifically, the locations of candidate data transmission slots shown in FIG. 4 are determined based on the starting symbols 38 and lengths 39 of the data in the table 30. For better illustration, the candidate slots 41 to 46 are represented by blocks of the same patterns as the rows 31 to 36 respectively.

The block diagram 40 further illustrates a plurality of symbols 47, wherein the symbols 47 comprise symbols 0 to 13. Each candidate data transmission slot may extend over a plurality of symbols. For example, candidate slot 41 (represented by a block with a vertical line pattern) corresponds to the row 31, and therefore the starting symbol of the candidate slot 41 is 0 (the first symbol), and the length of the candidate slot 41 is 7 symbols. Similarly, the starting symbols of second to sixth candidate data transmission slots 42 to 46 are 3, 6, 7, 10, and 12 respectively, and the lengths of the second to sixth candidate slots 42 to 46 are 4, 4, 7, 2, and 2 symbols respectively. The vertical ordering of the candidate data transmission slots 41 to 46 may be based on the row indexes 37 of the rows 31 to 36 respectively. The candidate slots 45 and 46 may be represented at the same level as the sixth candidate slot 46 is the final slot of the block of symbols shown in FIG. 4. It should be noted that the vertical ordering of the candidate data transmission slots are for illustration only; for example, the sixth candidate slot 46 may also be represented in a consecutive line after the fifth candidate slot 45.

The block diagram 40 further illustrates index allocations of the respective candidate data transmission slots. Indexes of the plurality of candidate slots may be determined based on the algorithm 1 described above. The example described below is based on the candidate slots being candidate physical downlink shared channel (PDSCH) channel slots, but this is not essential to all embodiments. In this example, a semi-static hybrid automatic repeat request acknowledgement (HARQ-ACK) codebook is constructed such that the overlapping candidates slots (e.g. PDSCH candidates) are assigned with the same index in the codebook and the relevant user device (e.g. the UE 12) does not expect to receive more than one PDSCH among the group of PDSCH candidates associated with the same index.

This ensures that each index in the codebook is related to only one PDSCH, since there is no overlapping PDSCHs expected. With reference to block diagram 40, the candidate slot 41 is assigned with the index '0'. As candidate slots 42 and 43 have overlapping symbols with candidate slot 41, the indexes of the candidate slots 42 and 43 are also '0'. As such, only one of the candidate slots 41 to 43 may be used for transmission. Regarding the subsequent candidate slots, the index of the candidate slot 4 is incremented to 1, as there is no overlap of the candidate slot 44 and the candidate slot 41. The index of the candidate slot 45 is the same as the index of candidate slot 44 due to the overlap between the candidate slot 45 and the candidate slot 44. The index of the candidate slot 46 is incremented to 2.

In some circumstances, it may be advantageous to allow overlapping candidate data transmission slots (e.g. PDSCH candidates). For example, overlapping PDSCH candidates may be allowed for intra-UE multiplexing/prioritization of dynamic grant PDSCHs (e.g. URLLC—ultra-reliable low latency communications), multiple configurations of semi-persistent scheduling (SPS) PDSCHs (e.g. URLLC, or Semi-static joint HARQ-ACK codebook generation across transmit and receive points (TRPs) (multi-TRP)). When there is overlapping, the overlapped PDSCHs should be associated with different indexes in the semi-static codebook, which is not currently supported by semi-static codebook determination algorithm (Algorithm 1) described above.

Figure 5:
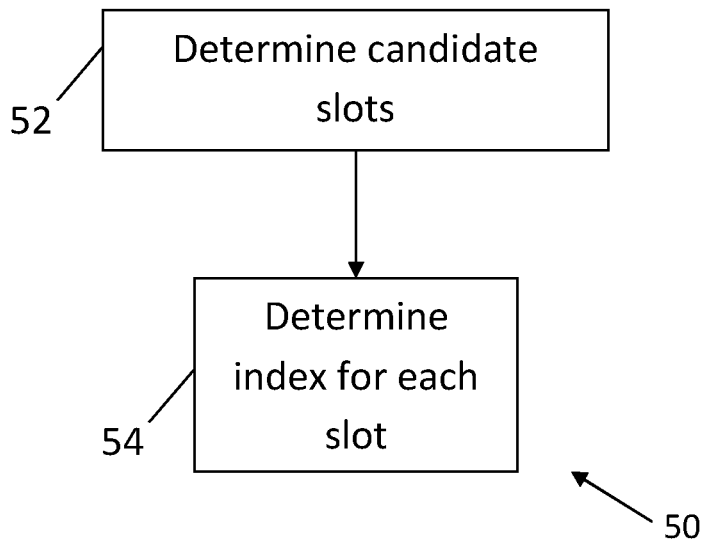
FIG. 5 is a flow chart showing an algorithm in accordance with an example embodiment.

FIG. 5 is a flow chart showing an algorithm, indicated generally by the reference numeral 50, in accordance with an example embodiment. At operation 52, one or more candidate data transmission slots may be determined, for example, based on a TDRA table (such as the table 30). Each of the determined candidate slots may have an index, and may be arranged in an order. At operation 54, the index for one or more candidate slots (e.g. each data transmission slot) is determined. For example, the indexes may be determined such that overlapping of the candidate slots may be allowed.

Figure 6:
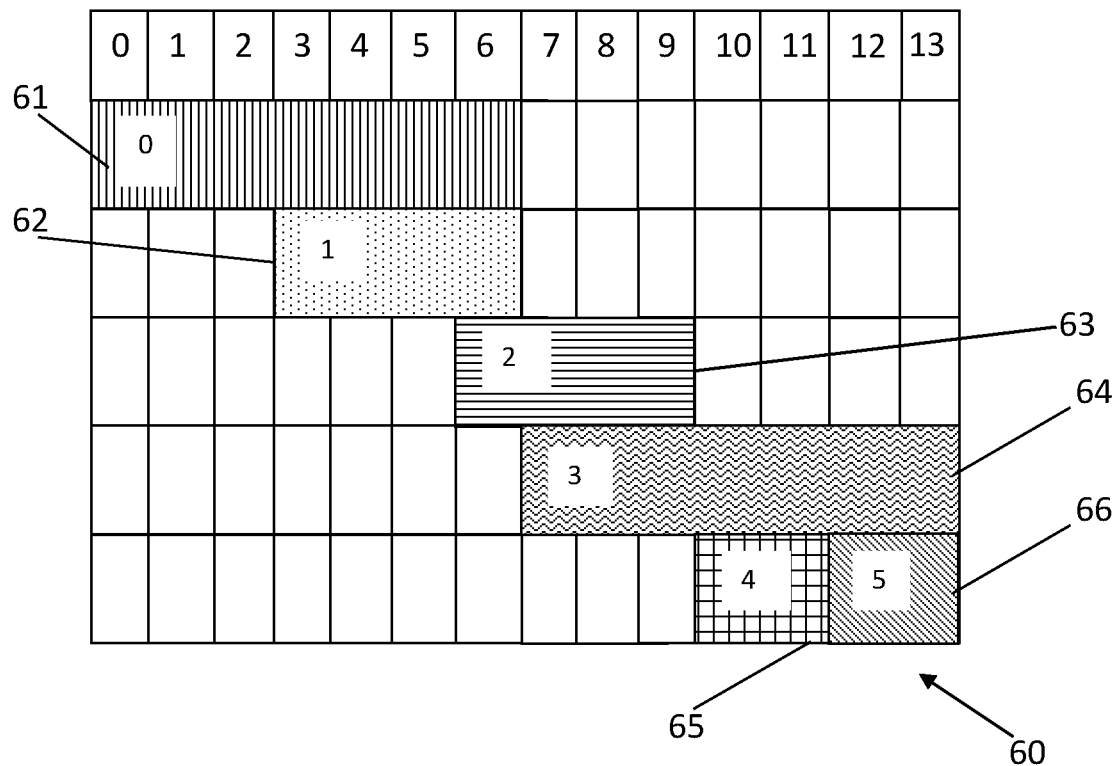
FIG. 6 is a block diagram showing a bit allocation in accordance with an example embodiment.

FIG. 6 is a block diagram, indicated generally by the reference numeral 60, showing a bit allocation in accordance with an example embodiment. The block diagram 60 comprises the candidate data transmission slots 61 to 66, which may be similar to the candidate slots 41 to 46 described above. The indexes of the candidate slots 61 to 66 are assigned such that all candidate slots have different indexes. As such, the candidate slot 61 has an index '0', the next candidate slot 62 has an incremented index '1', the next candidate slot 63 has an incremented index '2', the next candidate slot 64 has an incremented index '3', the next candidate slot 65 has an incremented index '4', and the next candidate slot 66 has an incremented index '5'.

Allocating all overlapping candidate data transmission slots (e.g. PDSCH candidates) with different indexes (as shown in in FIG. 6) may cause an increase in a codebook payload size, which may not be acceptable.

Alternatively, or in addition, to the use of multiple indexes as described above with reference to FIG. 6, two different codebooks (with two different TDRA tables) may be constructed for different traffic types (e.g. eMBB vs URLLC), such that the indexing according to the codebook for eMBB may not allow overlapping PDSCH candidates, and the indexing according to the codebook for URLLC allows overlapping PDSCH candidates. Again, this may not be acceptable in all embodiments.

Figure 7:
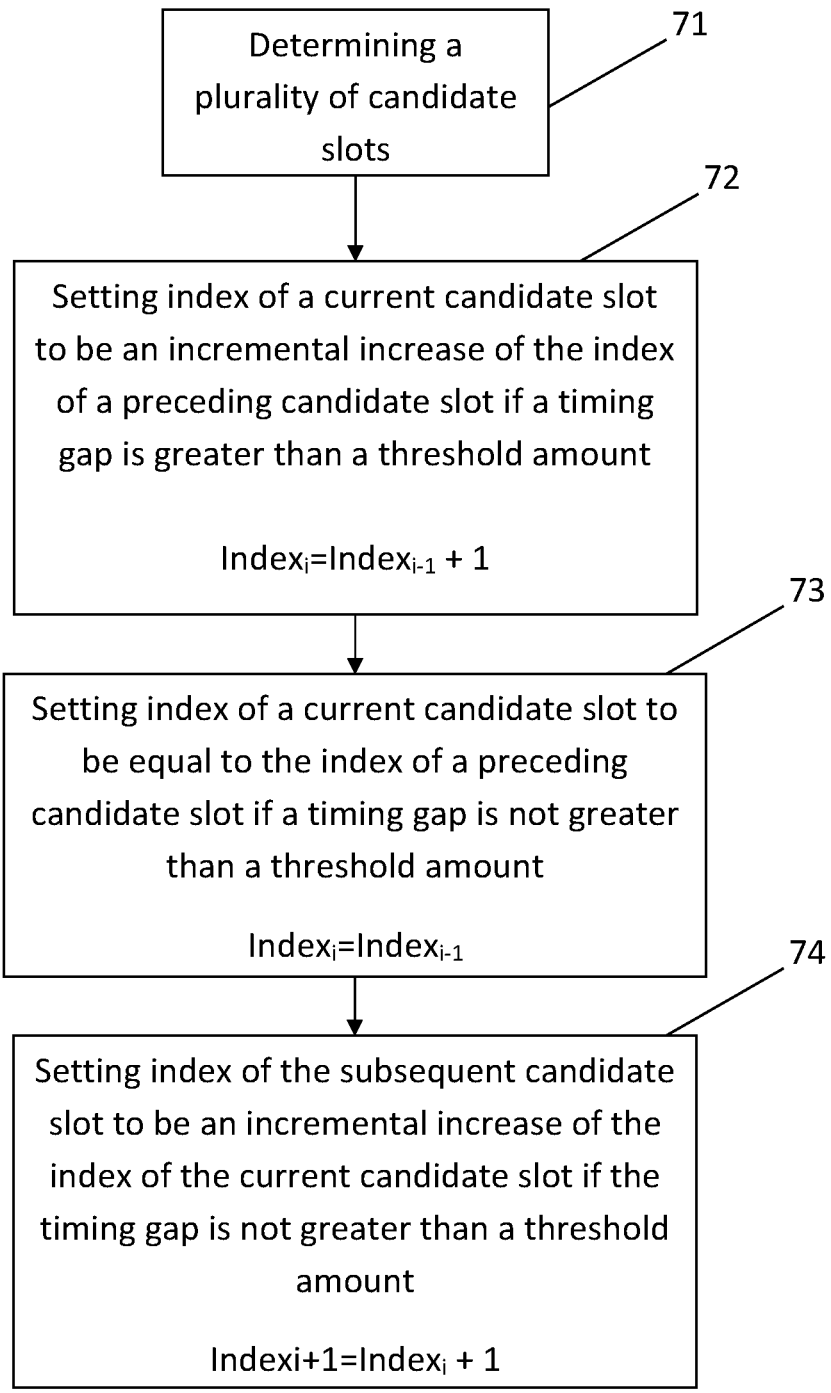
FIG. 7 is a flow chart showing an algorithm in accordance with an example embodiment.

FIG. 7 is a flow chart showing a data transmission slot indexing process, indicated generally by the reference numeral 70, in accordance with an example embodiment.

At operation 71 of the algorithm 70, a plurality of candidate data transmission slots are determined. Each candidate slot may be assigned with an index and said candidate slots may be arranged in an order (e.g. an ascending order based on the starting symbols of the candidate slots). The indexes of one or more of the plurality of candidate slots may be set according to operations 72 to 74, based, at least in part, on a timing gap between a start of a current candidate data transmission slot and a start of a subsequent candidate data transmission slot. Examples of timing gaps are discussed in detail below.

At operation 72, in the event that the timing gap between the start of a current candidate slot and the start of a subsequent slot of the plurality is greater than a threshold amount, the index ($Index_i$) of the current candidate slot (of the plurality of candidate slots) may be set to be an incremental increase of the index of a preceding candidate slot ($Index_{i-1}$). As such, $Index_i$ may be equal to $Index_{i+1}$.

At operation 73, in the event that the timing gap between the start of the current candidate slot and the start of the subsequent slot of the plurality is not greater than the threshold amount, the index (Index$_i$) of the current candidate data transmission slot may be set to be equal to the index of the preceding candidate data transmission slot (Index$_{i-1}$). As such, Index$_i$ may be equal to Index$_{i-1}$.

At operation 74, in the event that the timing gap between the start of the current candidate data transmission slot and the start of the subsequent data transmission slot of the plurality is not greater than the threshold amount, the index (Index$_{i+1}$) of the subsequent candidate slot may be set to be an incremental increase of the index of the current candidate slot (Index$_i$). As such, Index$_{i+1}$ may be equal to Index$_i$+1.

The operations 72 to 74 may be repeated as required, as discussed further below.

In some embodiments, the operation 74 may be optional. For example, the operation 74 may be performed at a different time or the functionality implemented in a different way. In one embodiment, once the index of the current slot has been set to be equal to the index of the previous slot (in operation 73), the subsequent slot may be automatically increased. Moreover, in some embodiments the function of the operation 74 may be implemented in a following loop of the algorithm. The skilled person will be aware of many suitable variants.

In one example, allowing overlapping of candidate slots (e.g. PDSCHs) may support low latency for high priority traffic such as URLLC. For example, when low priority traffic has been scheduled and high priority traffic arrives later, transmission of the high priority traffic may not need to be delayed until the next non-overlapping occasion.

Example embodiments are provided below to apply an additional threshold on the bit-index allocation of semi-static HARQ-ACK codebook construction. The additional threshold can be a latency threshold (e.g. represented with the number of symbols). The additional threshold may be configured via signalling and can be adjusted to meet latency requirements of different traffic types. The additional threshold may also be adjusted to meet reduced codebook sizes and satisfy performance requirements on HARQ-ACK reception. The determination of the index of the candidate slots based on the additional threshold is described in further detail below with reference to FIGS. 8 to 13.

In an example embodiment, if the timing gap between the starting symbols of a current candidate slot and a subsequent candidate slot is sufficiently small (e.g. less than or equal to a threshold amount), instead of performing transmission on the current candidate slot, the gNB may hold the data and perform the transmission on the subsequent candidate slot. As such, instead of allocating a different index for the current candidate slot, the current candidate slot may be allocated with the same index as a preceding candidate slot (as transmission is now being performed in the subsequent candidate slot, and the current candidate slot could possibly be skipped for transmission).

Figure 8:
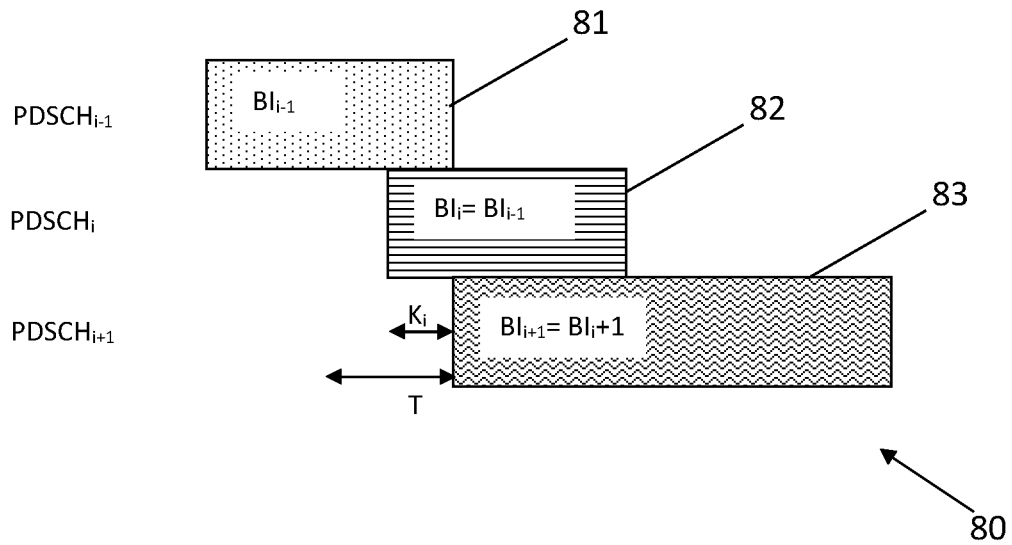
FIGS. 8 and 9 are block diagrams showing bit allocation extracts in accordance with example embodiments.

FIG. 8 is a block diagram, indicated generally by the reference numeral 80, showing a bit allocation extract in accordance with an example embodiment. The block diagram 80 comprises a current candidate slot 82 (PDSCH$_i$ with an index BI$_i$), a preceding candidate slot 81 (PDSCH$_{i-1}$ with an index BI$_{i-1}$), and a subsequent candidate slot 83 (PDSCH$_{i+1}$ with an index BI$_{i+1}$). (Note that the term BI$_n$ is used interchangeably with the term Index$_n$ referred to above such that, for example, the index BI$_i$ may be referred to as Index$_i$.)

The candidate slots 81, 82, and 83 may be arranged in an order, for example, based on their respective starting symbols. Index allocation may be performed for each of the candidate slots 81, 82, and 83. For example, the index of the current candidate slot 82 may be determined based, at least partially, on a timing gap threshold (TI). For example, when determining the index for the current candidate slot 82, it may be determined whether a timing gap (K) between the start of the current candidate slot 82 and the subsequent candidate slot 83 is greater than the threshold amount (such as the timing gap threshold T). For example, the timing gap threshold T may be corresponding to two symbols, and the timing gap K may correspond to one symbol.

In the example block diagram 80, the timing gap K$_i$ is not greater than the timing gap threshold T. Thus, in accordance with the operation 73 of the algorithm 70 described above, BI$_i$ (i.e. the index of current candidate slot 82) is set to be equal to BI$_{i-1}$ (i.e. the index of the preceding candidate slot 81). When BI$_i$ is set to be equal to BI$_{i-1}$, BI$_{i+1}$ (the index of the next candidate slot 83) may be incremented such that BI$_{i+1}$ is set to be equal to BI$_i$+1 (see operation 74 of the algorithm 70). This may ensure that, after waiting for K$_i$ to transmit data related to the current candidate slot on the subsequent candidate slot, the subsequent candidate slot (having a different index) may be available to be used for transmission.

Figure 9:
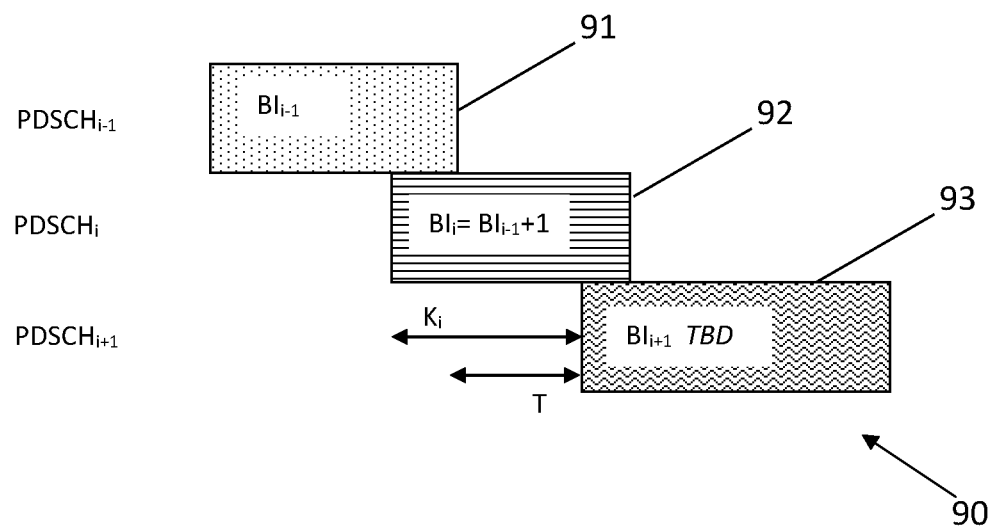

FIG. 9 is a block diagram, indicated generally by the reference numeral go, showing a bit allocation extract in accordance with an example embodiment. The block diagram 90 comprises a current candidate slot 92 (PDSCH$_i$ with an index BI$_i$), a preceding candidate slot 91 (PDSCH$_{i-1}$ with an index BI$_{i-1}$), and a subsequent candidate slot 93 (PDSCH$_{i+1}$ with an index BI$_{i+1}$). For example, when determining the index for the current candidate slot 92, it may be determined whether a timing gap (K$_i$) between the start of the current candidate slot 92 and the subsequent candidate slot 93 is greater than the threshold amount (such as the timing gap threshold T). For example, the timing gap threshold T may be corresponding to two symbols, and the timing gap K$_i$ may correspond to three symbols.

In the example block diagram go, the timing gap K$_i$ is greater than the timing gap threshold T, BI$_i$ is set (e.g. at operation 72) to be an incremental increase to BI$_{i-1}$, such as BI$_{i+1}$. In the next iteration, the subsequent candidate slot 93 may become a current candidate slot, such that the index BI$_{i+1}$ of the subsequent candidate slot 93 may be determined by determining whether the timing gap between the start of the subsequent candidate slot 93 and a second subsequent candidate slot is greater or not greater than the threshold amount.

Figure 10:
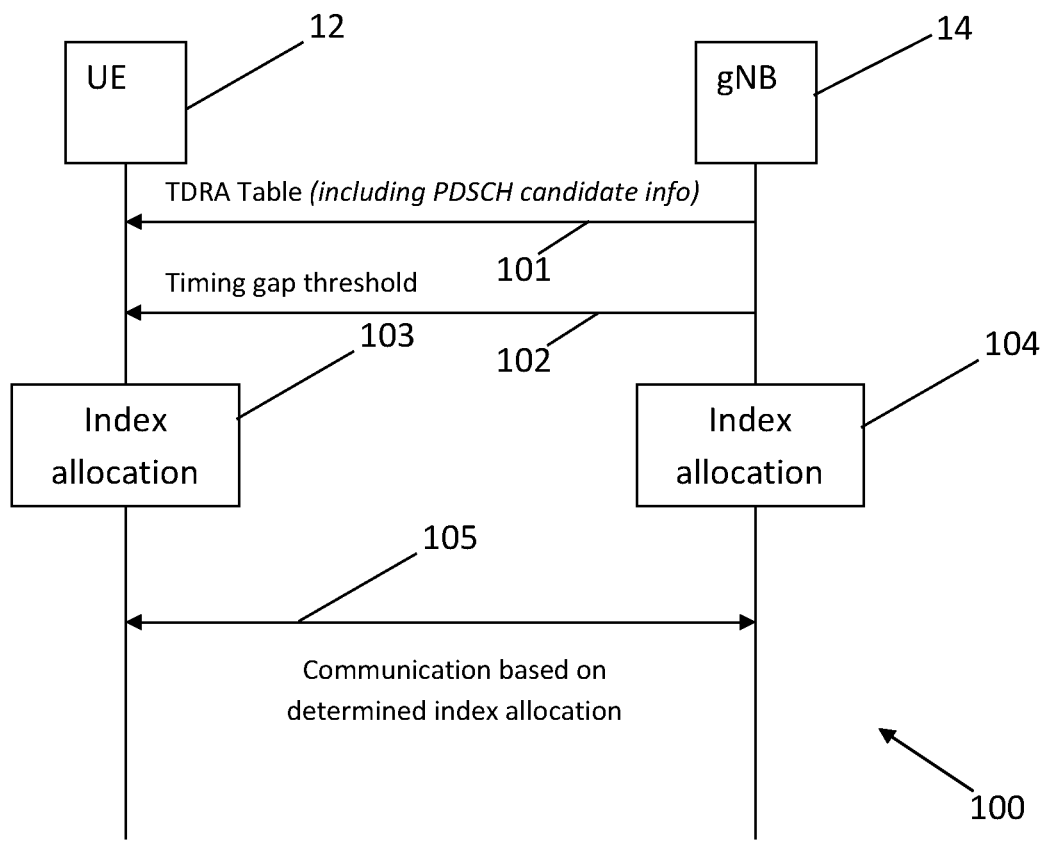
FIG. 10 shows a message sequence in accordance with an example embodiment.

FIG. 10 shows a message sequence, indicated generally by the reference numeral 100, in accordance with an example embodiment. Similar to the message sequence 20 described in the FIG. 2, the message sequence 100 may enable the gNB 14 (or some other network node) to provide information (e.g. in the form of a time domain resource allocation (TDRA) table) to the user device 12 (or some other user device) for identifying a plurality of candidate slots (such as physical downlink shared channel (PDSCH) slots) for communications between the user device and the gNB.

The message sequence 100 starts at message 101, where information, such as the TDRA table referred to above, is sent from the gNB 14 to the user device 12. Thus, the user device 12 receives data defining a plurality of candidate data transmission slots from the gNB 14.

At message 102, the gNB 14 may send information regarding a timing gap threshold (e.g. the threshold amount described above). Information regarding the timing gap threshold may allow the user device 12 to perform the index allocation by taking into account the timing gap threshold (see, for example, the algorithm 70 described above). The timing gap threshold may be configured by the gNB 14 statically or dynamically based on one or more of RRC, DCI, and/or MAC CE. Indeed, there are many ways in which the timing gap threshold may be communicated (e.g. as part of an RRC procedure). Alternatively, the TDRA table and the timing gap threshold can be transmitted at the same time (or in the same message). In yet another alternative, the timing gap threshold may be provided before the TDRA table (for example, the timing gap threshold may be pre-configured).

On the basis of the contents of the messages 101 and 102, the user device 12 performs an index allocation to set an index of each candidate data transmission slot (e.g. a PDSCH bit index), as indicated by the function 103. A similar allocation may be carried out at the gNB 14 (indicated by the function 104) such that the TDRA table provide in the message 101 is converted into PDSCH index allocations (based at least partially on the timing gap threshold) at both the user device 12 and the gNB 14. The index allocation (in functions 103 and/or 104) may be performed in accordance with the algorithm 70 described above. Of course, the index allocation(s) may be implemented in a different way.

At message 105 of the message sequence 100, communications may occur between the user device 12 and the gNB 14 based on the determined index allocations.

Figure 11:
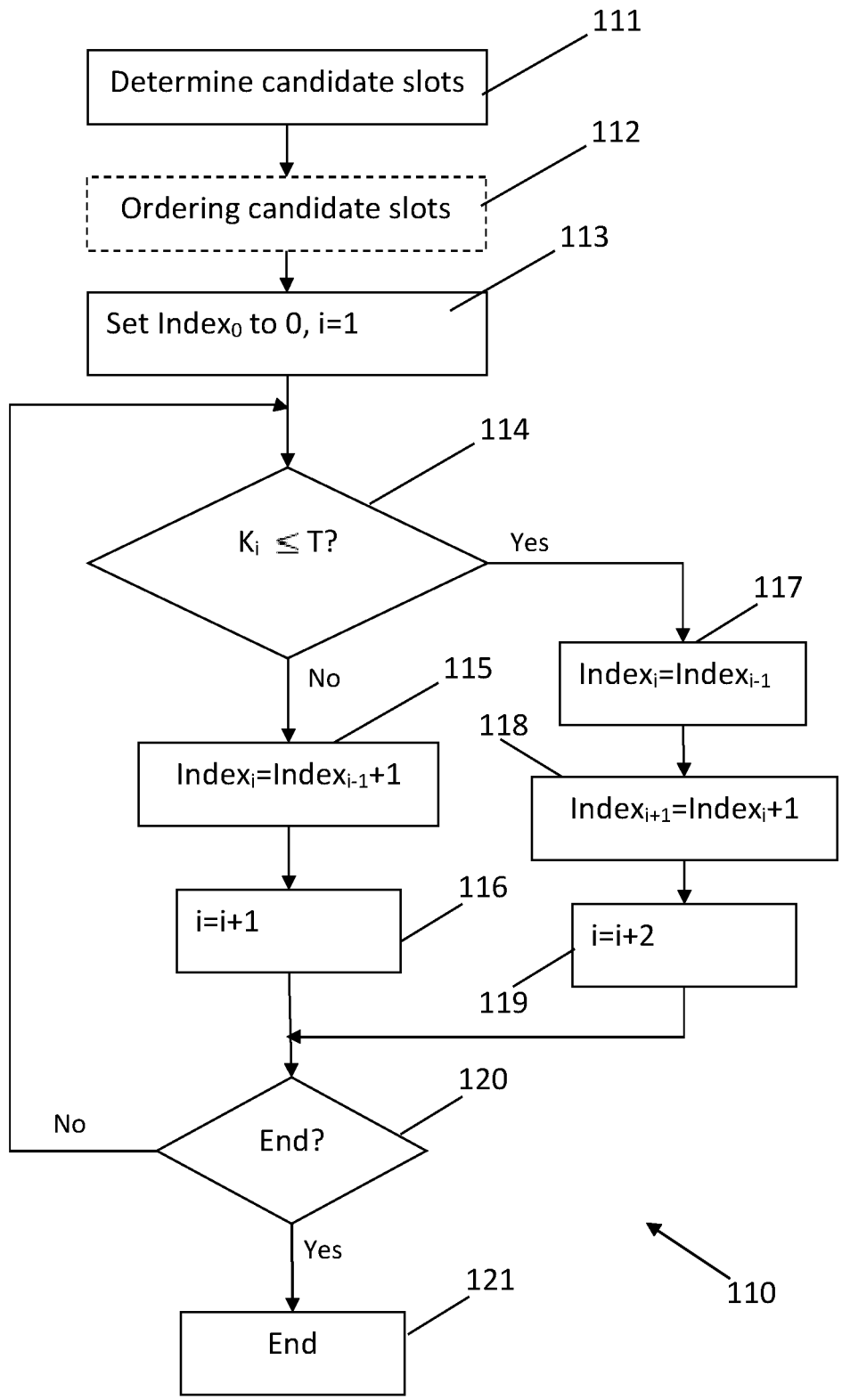
FIG. 11 is a flow chart showing an algorithm in accordance with an example embodiment.

FIG. 11 is a flow chart showing an algorithm, indicated generally by the reference numeral 110, in accordance with an example embodiment.

At operation 111, a plurality of candidate slots (e.g. N PDSCH candidates in a codebook) are determined (e.g. at a user device, such as the UE 12), for example, based on data relating to the plurality of candidate slots, received from a network node (such as the gNB 14).

At optional operation 112, the plurality of candidate slots may be ordered. For example, the candidate slots may be ordered in an ascending order based on their respective starting symbols, such that a candidate slot with the earliest starting symbol is placed first in the list.

At operation 113, an index of a candidate slot that is first in the list (e.g. $Index_0$) is set to '0', and the next candidate slot is assigned an ordering (e.g. row index 37) of '1', such that i=1. (As noted above, the term $Index_n$ is used interchangeably with the term $BI_n$ such that, for example, the index $BI_i$ discussed above with reference to FIGS. 8 and 9 may be referred to as $Index_i$.)

At operation 114, it is determined, for a current candidate data transmission slot, whether a timing gap ($K_i$) between the start of the current candidate slot and the start of the subsequent candidate slot is greater than a threshold timing gap T or whether the timing gap is less than or equal to the threshold timing gap. If the timing gap is greater than the threshold timing gap, the algorithm proceeds to perform operations 115 and 116. Alternatively, if the timing gap is less than or equal to the threshold timing gap, the algorithm proceeds to perform operations 117, 118, and 119.

At operation 115, when the timing gap is determined to be greater than the threshold timing gap, the index of the current candidate slot is set to be an incremental increase of the index of a preceding candidate slot, such that $Index_i = Index_{i+1}$.

At operation 116, for the next iteration, a subsequent candidate slot (ordered consecutively after the current candidate slot) is set to become a next current candidate slot (i=i+1), such that the index for the subsequent candidate slot may be determined in the next iteration by performing the algorithm 110 for the subsequent candidate slot. The algorithm 110 then moves to operation 120.

At operation 117, when the timing gap is determined to be less than or equal to the timing gap threshold, the index of the current candidate slot is set to be equal to the index of the preceding candidate slot, such that $Index_i = Index_{i-1}$.

At operation 118, the index of the subsequent candidate slot is set to be an incremental increase of the index of the current candidate slot, such that $Index_{i+1} = Index_{i+1}$. This increment of the index of the subsequent candidate slot is performed because the index of the current candidate slot had not been incremented from the index of the previous slot. This ensures that any data relating to the current candidate slot that has been delayed to be transmitted in the subsequent candidate slot is not delayed any further. (As indicated above, the operation 118 could be implemented in a different way, such as on a following loop of the algorithm 110.)

As the index for the subsequent candidate slot ($Index_{i+1}$) had been determined in operation 118, a next iteration is used for another subsequent candidate slot (determining $Index_{i+2}$). At operation 119, the next subsequent candidate slot (ordered consecutively after the subsequent candidate slot) is set to become a next current candidate slot (i=i+2), such that the index for the next subsequent candidate slot may be determined in the next iteration by performing the algorithm 110 for the next subsequent candidate slot. The algorithm 110 then moves to operation 120.

At operation 120, it is determined whether there are any candidate slots remaining for determination of their respective indexes. If indexes of one or more candidate slots are not yet determined, the algorithm does not end, and loops back to operation 114. If there are no remaining candidate slots, the algorithm ends at operation 121.

In an example embodiment, an index for a candidate slot ordered last in the plurality of candidate data transmission slots is set to be an incremental increase of an index of a preceding candidate slot (e.g. ordered second last). This may be done because there are no subsequent candidate slots after the last, and therefore a timing gap may not be compared with the threshold timing gap.

It should also be noted that a similar method to the algorithm 170 described below with reference to FIG. 15 could be used to determine the index for the last candidate slot.

In an example embodiment, the algorithm 110 may be performed according to the following algorithm 2:

Algorithm 2:

1. Define O as a set of N PDSCH candidates after pruning based on TDRA table and DL/UL pattern.
2. Sort O in ascending order based on the starting symbols of the PDSCH candidates (candidate with earlier starting symbol is placed first). If two candidates start at the same symbol, the candidate with longer length is placed first.

Figure 12:
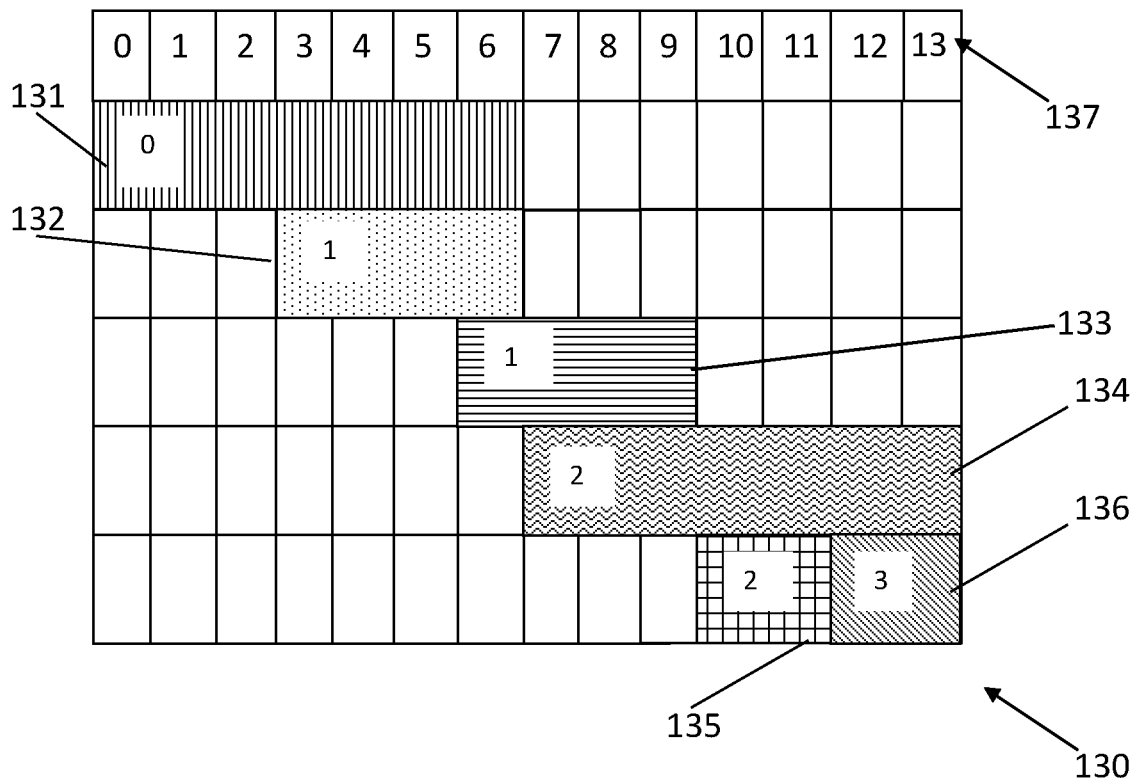
FIGS. 12 and 13 are block diagrams showing bit allocations in accordance with example embodiments.

Algorithm 2:

3. T : threshold configured by the gNB (either by RRC, DCI or MAC CE)
4. $BI_0 = 0$
5. For i = 1 to N − 2
6.    $\kappa_i$: timing gap between the first symbol of $PDSCH_i$ and the first symbol of $PDSCH_{i+1}$.
7.    If $\kappa_i \leq T$ then
8.       $BI_i = BI_{i-1}$
9.       $BI_{i+1} = BI_i + 1$
10.      i = i + 2
11.    Else
12.       $BI_i = BI_{i-1} + 1$
13.      i = i + 1
14.    End
15. End
16. $BI_{N-1} = BI_{N-2} + 1$ FIG. 12 is a block diagram, indicated generally by the reference numeral 130, showing a bit index allocation in accordance with an example embodiment.

The block diagram 130 comprises candidate slots 131 to 136, which may be data transmission slots generated from the rows 31 to 36 of the table 30 described above respectively. The block diagram 130 further illustrates a plurality of symbols 137, wherein the symbols 137 comprise symbols 0 to 13. Each candidate slot may comprise a plurality of symbols. The starting symbols of candidate slots 131 to 136 are 0, 3, 6, 7, 10 and 12 respectively, and the lengths of the candidate slots 131 to 136 are 7, 4, 4, 7, 2 and 2 symbols respectively.

The block diagram 130 further illustrates index allocations of the respective candidate slots. For example, with reference to algorithm 110, the candidate slot 132 may represent a current slot, and a timing gap threshold may be equal to 2 symbols. As the timing gap (3 symbols) between the start (symbol 3) of the candidate slot 132 and the start (symbol 6) of the next candidate is determined (at operation 114) to be greater (3>2) than the timing gap threshold, the index of the candidate slot 132 is set (at operation 115) to be 1, which is an incremental increase from the index '0' of the preceding candidate slot 131.

In the next iteration (i=i+1), the candidate slot 133 may represent a current data transmissions slot. As the timing gap (1 symbol) between the start (symbol 6) of the candidate slot 132 and the start (symbol 7) of the next candidate is determined (at operation 114) to be less (1<2) than the timing gap threshold, the index of the candidate slot 133 is set (at operation 117) to be 1, which is equal to the index "1" of the preceding candidate slot 132. In the same iteration, the index of the subsequent candidate slot 134 is set (at operation 118) to be 2, which is an incremental increase from the index '1' of the current candidate slot 133.

The indexes for the candidate data transmission slots 135 and 136 may be determined similarly, according to the algorithm 110.

Figure 13:
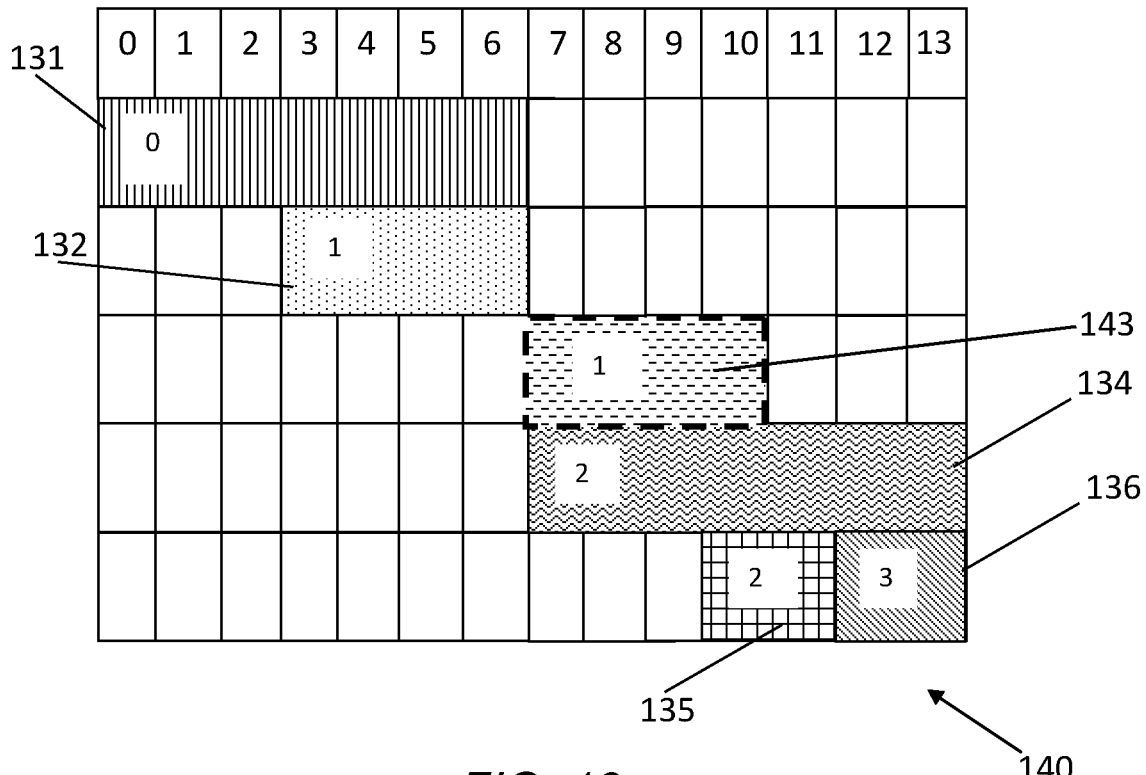

FIG. 13 is a block diagram, indicated generally by the reference numeral 140, showing a bit allocation in accordance with an example embodiment. The candidate data transmission slots 131, 132, 134, 135, and 136 are similar to the corresponding candidate slots of FIG. 12. As described above, when the index of a current candidate slot is set to be equal to the index of the preceding candidate slot, any data related to the current candidate slot may be delayed to be transmitted on the subsequent candidate slot until the start of said subsequent candidate slot. As such, a data transmission block 143 illustrates that the data related to the candidate slot 133 is delayed until the symbol 7, so that there is no overlap with data related to the candidate 132. This delay is required because a user device may not expect to receive data relating to more than one candidate data transmission slots with the same index allocation.

A number of variants to the embodiments described above are possible. Some example variants are described below.

Figure 14:
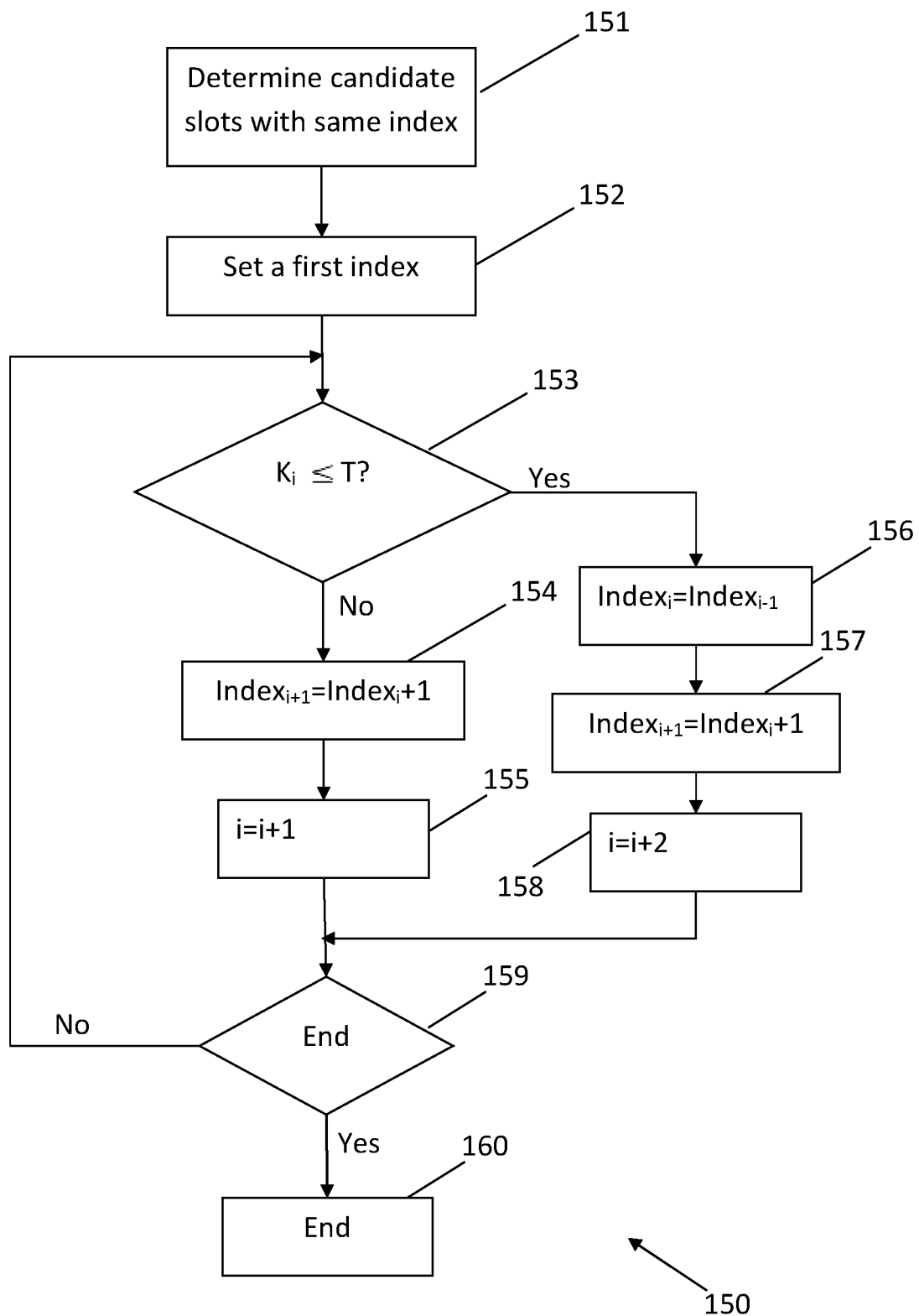
FIGS. 14 and 15 are flow charts showing algorithm in accordance with example embodiments.

FIG. 14 is a flow chart showing an algorithm, indicated generally by the reference numeral 150, in accordance with an example embodiment. At operation 151, one or more candidate data transmission slots are determined that are assigned with a same index according to the index allocation of FIG. 4 (e.g. based on the algorithm 1 described above). At operation 152, a first index is set for a candidate slot ordered first in the plurality of candidate slots with the same index. With reference to FIG. 4, a first plurality of candidate slots may comprise the candidate slots 41, 42, and 43 with the same index '0', and a second plurality of candidate slots may comprise the candidate slots 44 and 45 with the same index '1'. As such, for the first plurality of candidate slots, the first index set in operation 152 may be '0', and for the second plurality of candidate slots, the first index set in operation 152 may be '1'.

Operations 153 to 160 may be similar to operations 114 to 121 respectively. The operations 153 to 160 may be performed for each plurality of candidate slots with the same index, such that the index of one or of the plurality of candidate slots may be redefined. For example, the algorithm 150 may first be performed for the first plurality of candidate slots, and may then be performed for the second plurality of candidate slots.

Figure 15:
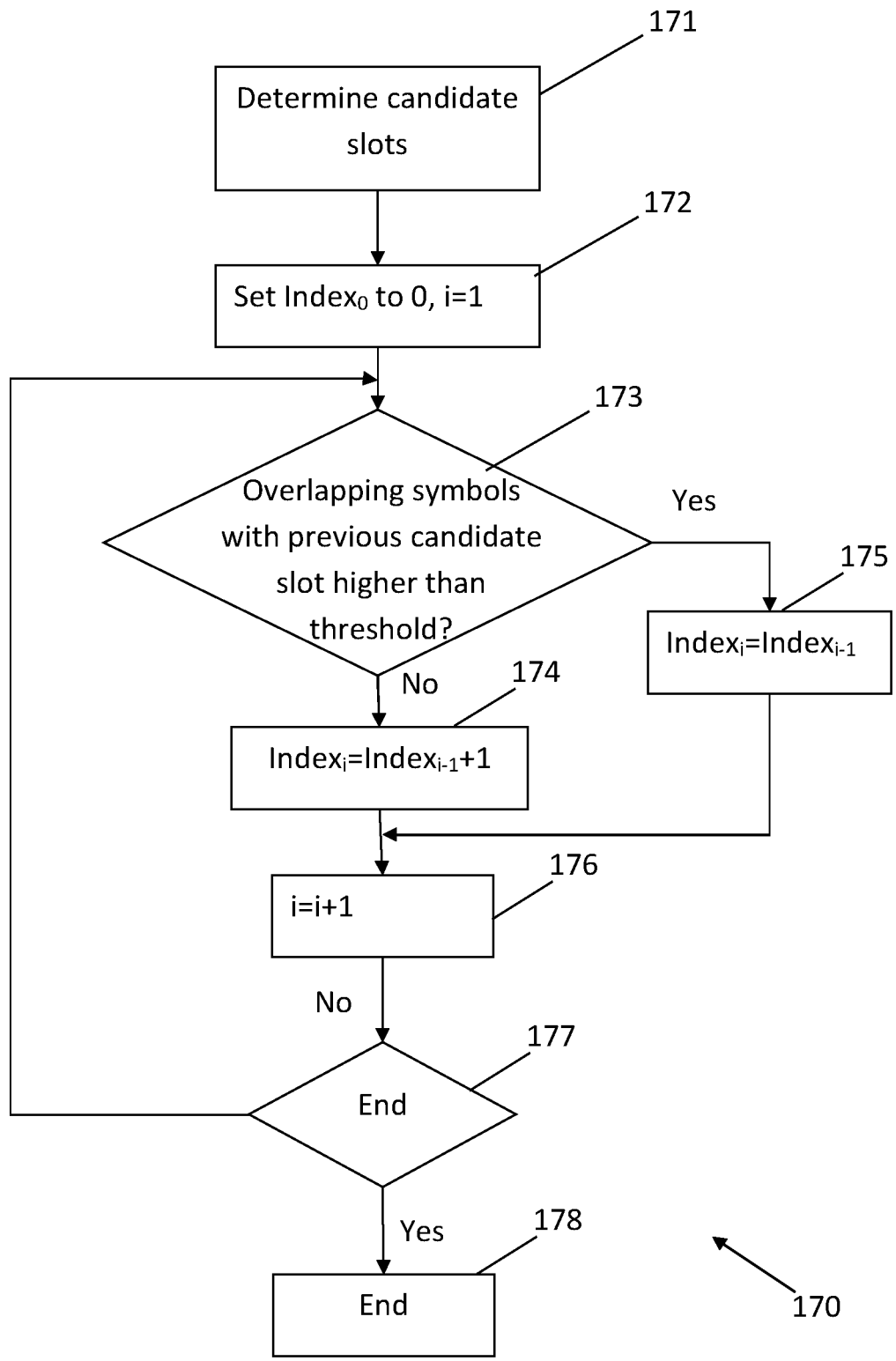

FIG. 15 is a flow chart showing an algorithm, indicated generally by the reference numeral 170, in accordance with an example embodiment. Operations 171 and 172 may be similar to the operations 111 and 113 of the algorithm 110.

At operation 173, it is determined whether a number of overlapping symbols of a current candidate slot with regards to a previous candidate slot is higher than a threshold. If the number of overlapping symbols exceeds the threshold, the index of the current candidate slot is set to be equal to an index of a preceding candidate slot at operation 175 ($Index_i = Index_{i-1}$). If the number of overlapping symbols is not higher than the threshold, the index of the current candidate slot is set to be an incremental increase of the index of a preceding candidate slot at operation 174 ($Index_i = Index_{i-1} + 1$).

At operation 176, for the next iteration, a subsequent candidate slot (ordered consecutively after the current candidate slot) is set to become a next current candidate slot (i=i+1), such that the index for the subsequent candidate slot may be determined in the next iteration by performing the algorithm 170 for the subsequent candidate slot.

At operation 177, it is determined whether there are any candidate slots remaining for consideration. If indexes of one or more candidate slots are not yet determined, the algorithm does not end, and loops back to operation 173. If there are no remaining candidate slots, the algorithm ends at operation 178.

The algorithm 170 may assist in reducing overlapping of data transmission slots that have different indices, such that when the overlapping is higher than the overlapping threshold, and the index is not incremented, the data related to the current candidate slot is delayed for transmission on the subsequent candidate slot, and thus avoiding any overlap with the preceding candidate slot.

Figure 16:
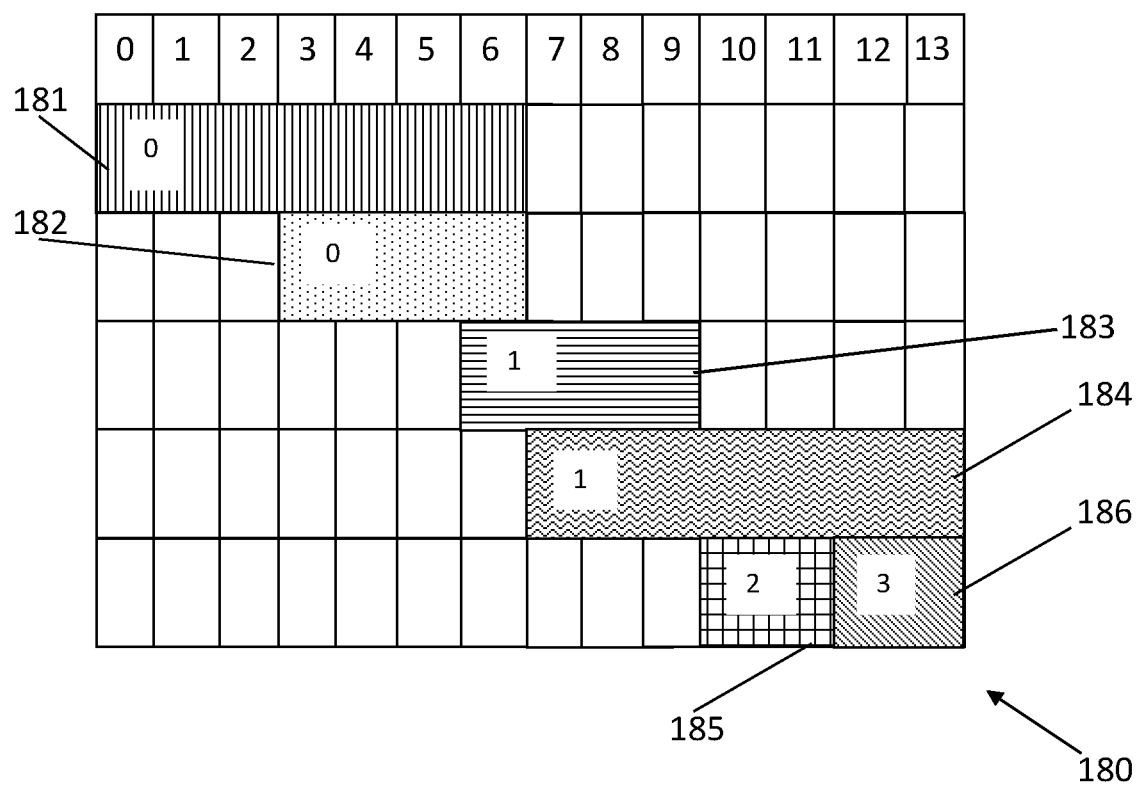
FIG. 16 is a block diagram showing a bit allocation in accordance with an example embodiment.

FIG. 16 is a block diagram, indicated generally by the reference numeral 180, showing a bit allocation in accordance with an example embodiment. The block diagram 180 comprises candidate data transmission slots 181 to 186 (e.g. defined according to table 30). With reference to FIG. 16, the candidate slot 182 may represent the current candidate slot. The overlapping threshold may be equal to 2 symbols. As the overlap of the candidate slot 182 with regard to the candidate slot 181 is 4 symbols, which is greater than the overlapping threshold, the index of the candidate slot 182 is set (at operation 175) to be '0', which is equal to the index of the candidate slot 181.

In the next iteration, the candidate slot 183 may represent the current candidate slot. The overlapping threshold may be equal to 2 symbols. As the overlap of the candidate slot 183 with regard to the candidate slot 182 is 1 symbol, which is not greater than the overlapping threshold, the index of the candidate slot 182 is set (at operation 174) to be '1', which is an incremental increase of the index of the candidate slot 181. The indexes of the candidate slots 184, 185, and 186 may be determined similarly based on the algorithm 170.

Figure 17:
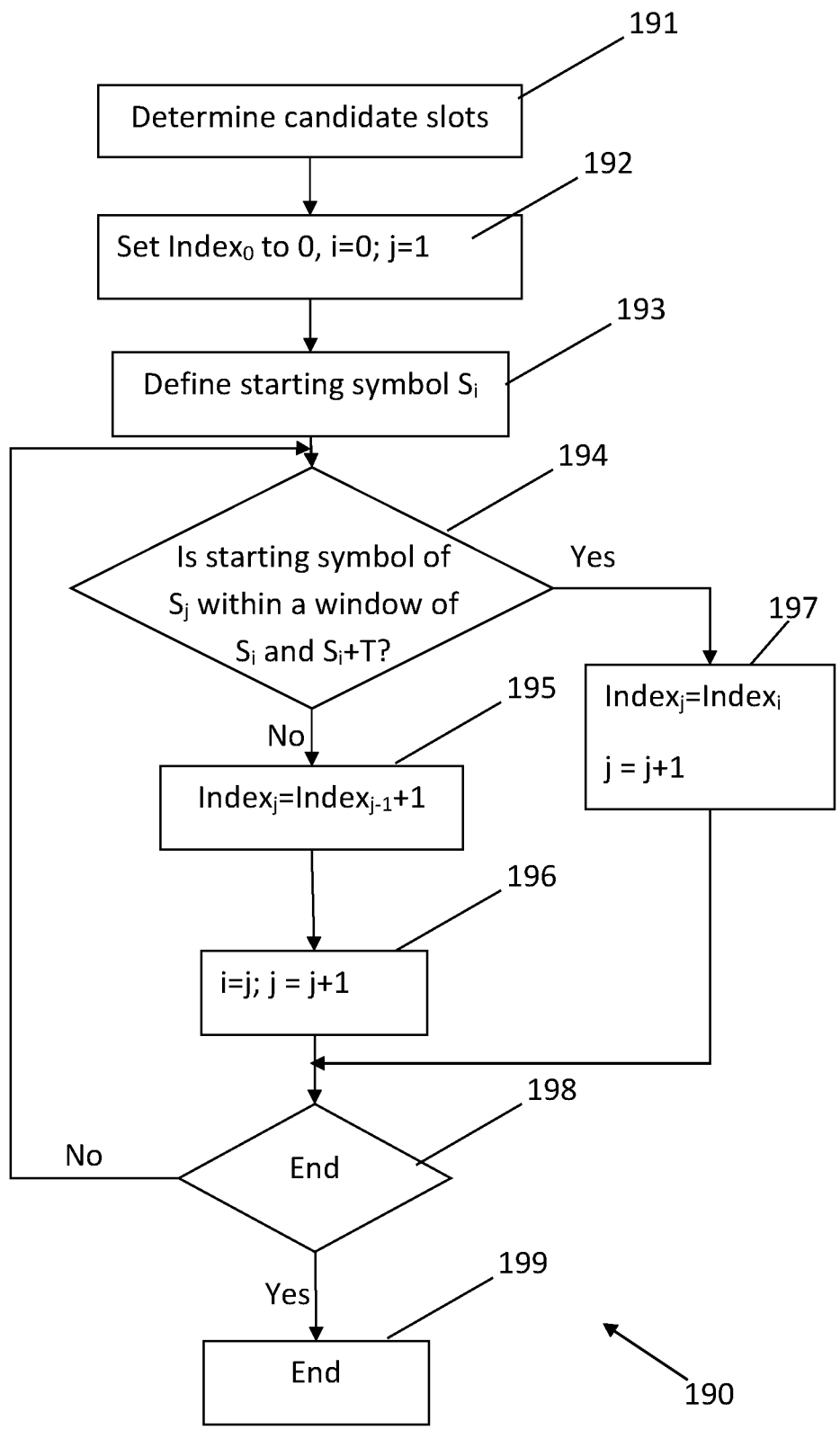
FIG. 17 is a flow chart showing an algorithm in accordance with an example embodiment.

FIG. 17 is a flow chart showing an algorithm, indicated generally by the reference numeral 190, in accordance with an example embodiment. Operations 191 and 192 may be similar to the operations 111 and 113 of the algorithm 110.

At operation 193, a first starting symbol ($S_i$) may be defined. The first starting symbol may be a starting symbol of a first candidate data transmission slot ordered first in a plurality of candidate slots.

At operation 194, for a current candidate slot, it is determined whether a current starting symbol ($S_j$) of the current candidate slot is within a first window (e.g. a sliding window) of the first starting symbol and a symbol threshold ($S_i+T$).

If the current starting symbol is within the first window, at operation 197, the index of the current candidate data transmission slot is set to be equal to the index of the first candidate slot within the same window. The variable j is incremented and the algorithm moves to operation 198.

If the current starting symbol is not within the first window, at operation 195, the index of the current candidate data transmission slot is set to be an incremental increase of the index of a preceding candidate slot and/or an incremental increase of the index of the first candidate slot.

At operation 196, for a next iteration, in case the index of the candidate slot is incremented, the current candidate slot may become the first candidate slot, such that i=j and the variable j is incremented. The algorithm 190 then moves to operation 198.

At operation 198, it is determined whether there are any candidate slots remaining for determination of their respective indexes. If indexes of one or more candidate slots are not yet determined, the algorithm does not end, and loops back to operation 194. If there are no remaining candidate slots, the algorithm ends at operation 199.

Figure 18:
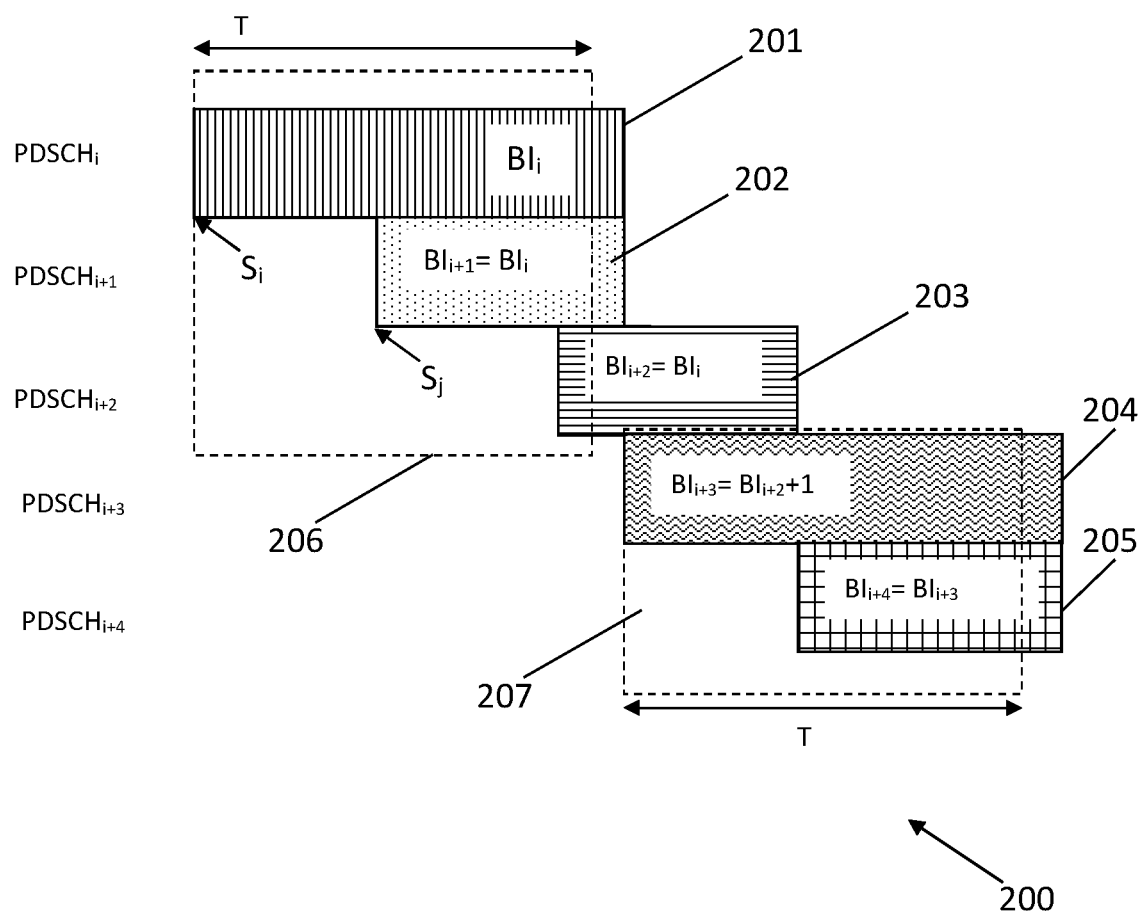
FIG. 18 is a block diagram showing a bit allocation in accordance with an example embodiment.

FIG. 18 is a block diagram, indicated generally by the reference numeral 200, showing a bit allocation in accordance with an example embodiment. The block diagram 200 comprises candidate data transmission slots 201 to 205 ($PDSCH_i$ to $PDSCH_{i+4}$) and windows 206 and 207. The windows 206 and 207 may have a window size T.

For example, with reference to FIG. 17, the candidate slot 201 may be the first candidate slot with the first starting symbol $S_i$, and the candidate slot 202 may be the current candidate slot with the current starting symbol $S_j$. As the current starting symbol of the candidate slot 202 is within the window 206, the index of the candidate slot 202 is set (at operation 197) to be equal to the index of the candidate slot 201 ($BI_{i+1}=BI_i$). Similarly, in the next iteration, when the candidate slot 203 becomes the current candidate slot, the index of the candidate slot 203 is also set (at operation 197) to be equal to the index of the candidate slot 201 ($BI_{i+2}=BI_i$) because the starting symbol of the candidate slot 203 is within the window 206. (Note that, as discussed above, the term $Index_n$ is used interchangeably with the term $BI_n$ such that, for example, the index $BI_i$ discussed above with reference to FIGS. 18 and 19 may be referred to as $Index_i$).

In the next iteration, when the candidate data transmission slot 204 becomes the current candidate slot, the index of the candidate slot 204 is set (at operation 195) to be an incremental increase to the index of the preceding candidate slot 201 ($BI_{i+3}=BI_{i+2}+1$) because the starting symbol of the candidate slot 204 is not within the window 206. At operation 196, the candidate slot 204 becomes the first candidate slot, such that the sliding window slides to the window 207, and indexes of any subsequent candidate slots are determined based on the starting symbol of the candidate slot 204 and the window 207.

For example, applying a sliding window may assist in minimizing the maximum delay between two PDSCH transmissions. With respect to FIG. 18, for example, the maximum delay of two possible transmissions is between the first symbol of $PDSCH_i$ and the first symbol of $PDSCH_{i+3}$. The delay can be further reduced by configuring a smaller window size T, which is achieved with an expense of higher payload size.

Figure 19:
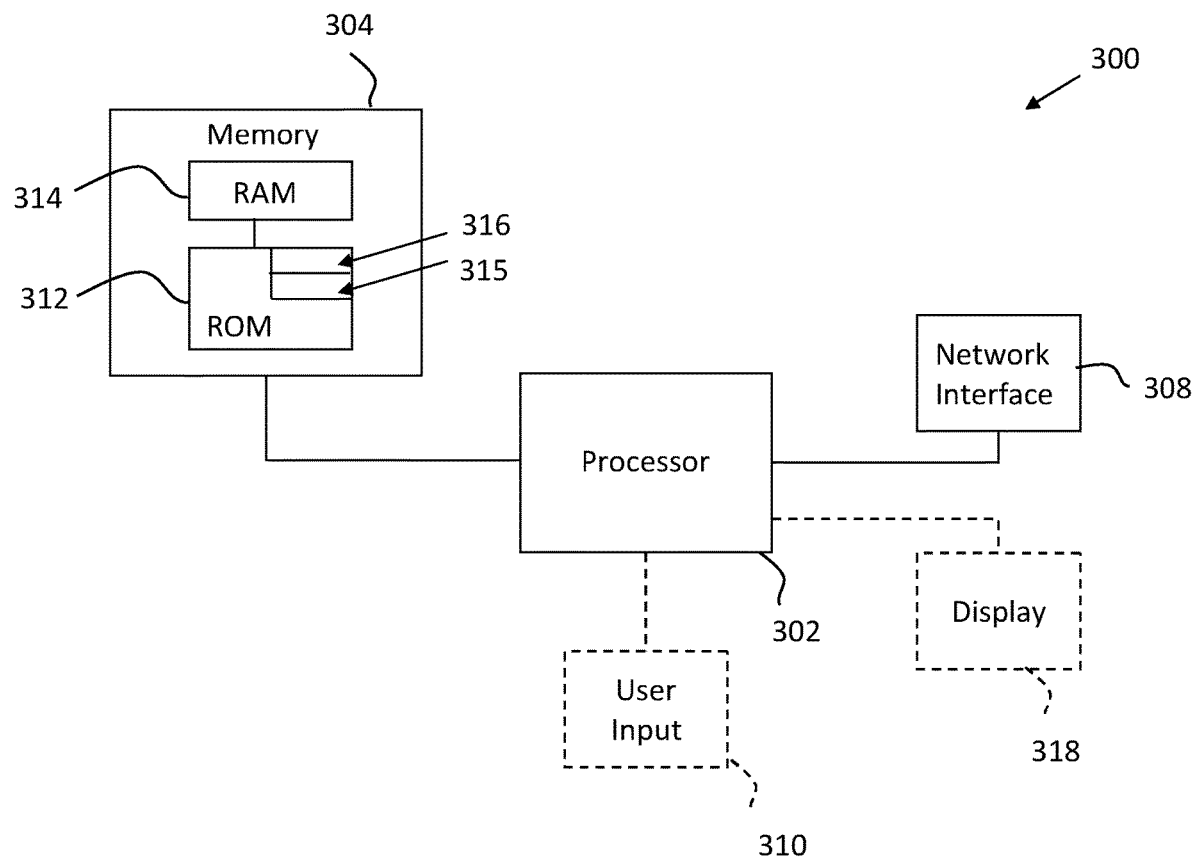
FIG. 19 is a block diagram of components of a system in accordance with an example embodiment.

For completeness, FIG. 19 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms and message sequences 20, 50, 70, 100, 110, 150, 170 and 190 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 20A:
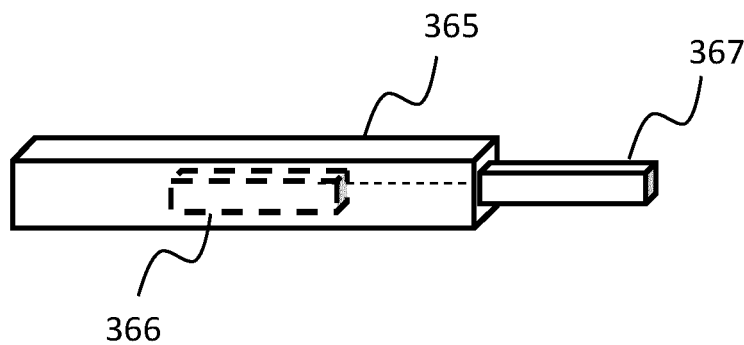
Figure 20B:
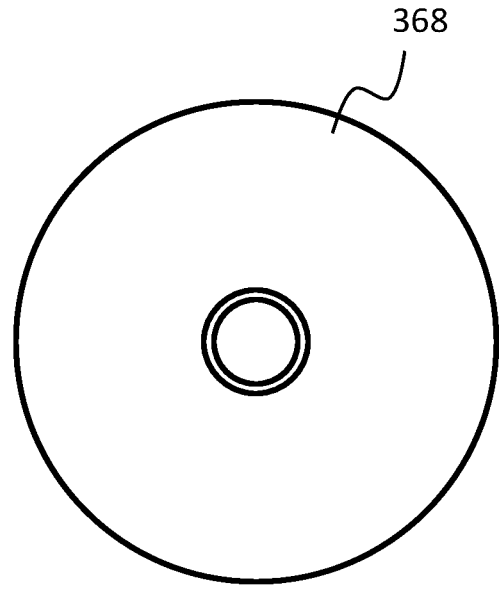

FIGS. 20A and 20B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 2, 5, 7, 10, 11, 14, 15 and 17 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

What is claimed is:

1. An apparatus comprising:
   at least one processor; and
   at least one memory including computer program code, the at least one memory and the computer program code configured to, with the at least one processor, cause the apparatus to perform at least the following:
   determining a plurality of candidate data transmission slots, wherein each candidate data transmission slot has an index and the plurality of candidate data transmission slots are arranged in an order;
   setting an index of a current candidate data transmission slot of the plurality of candidate data transmission slots to be an incremental increase of an index of a preceding candidate data transmission slot of the plurality of candidate data transmission slots in the event that a timing gap between a start of the current candidate data transmission slot and a start of a subsequent candidate data transmission slot of the plurality of candidate data transmission slots is greater than a threshold; and
   setting the index of the current candidate data transmission slot to be equal to the index of the preceding candidate data transmission slot of the plurality of candidate data transmission slots in the event that the timing gap is not greater than the threshold.

2. The apparatus as claimed in claim 1, wherein the at least one memory and the computer program code are configured to, with the at least one processor, cause the apparatus to further perform at least:
   setting an index of the subsequent candidate data transmission slot to be an incremental increase of the index of the current candidate data transmission slot of the plurality of candidate data transmission slots in the event that the timing gap is not greater than the threshold.

3. The apparatus as claimed in claim 1, wherein the at least one memory and the computer program code are configured to, with the at least one processor, cause the apparatus to further perform at least:
determining, for one or more of the plurality of candidate data transmission slots, whether the timing gap is greater than the threshold.

4. The apparatus as claimed in claim 1, wherein the at least one memory and the computer program code are configured to, with the at least one processor, cause the apparatus to further perform at least:
receiving configuration data defining the threshold,
wherein the threshold is dependent, at least in part, on a latency requirement of data traffic towards a user device.

5. The apparatus as claimed in claim 1, wherein the at least one memory and the computer program code are configured to, with the at least one processor, cause the apparatus to further perform at least:
transmitting data defining the plurality of candidate data transmission slots.

6. The apparatus as claimed in claim 5, wherein the data defining the plurality of candidate data transmission slots comprises a time domain resource allocation table.

7. The apparatus as claimed in claim 1, wherein the plurality of candidate data transmission slots are ordered based on starting symbols of the plurality of candidate data transmission slots.

8. The apparatus as claimed in claim 1, wherein the plurality of candidate data transmission slots are candidate physical downlink shared channel data transmission slots.

9. A method comprising:
determining a plurality of candidate data transmission slots, wherein each candidate data transmission slot has an index and the plurality of candidate data transmission slots are arranged in an order;
setting an index of a current candidate data transmission slot of the plurality candidate data transmission slots to be an incremental increase of an index of a preceding candidate data transmission slot of the plurality of candidate data transmission slots in the event that a timing gap between a start of the current candidate data transmission slot and a start of a subsequent candidate data transmission slot of the plurality of candidate data transmission slots is greater than a threshold; and
setting the index of the current candidate data transmission slot to be equal to the index of the preceding candidate data transmission slot of the plurality of candidate data transmission slots in the event that the timing gap is not greater than the threshold.

10. The method as claimed in claim 9, further comprising:
setting an index of the subsequent candidate data transmission slot to be an incremental increase of the index of the current candidate data transmission slot of the plurality of candidate data transmission slots in the event that the timing gap is not greater than the threshold.

11. The method as claimed in claim 9, further comprising:
receiving and/or transmitting data over an air interface using at least one of the plurality of candidate data transmission slots.

12. A non-transitory computer storage medium storing computer-executable instructions which, when executed on at least one processor, cause the at least one processor to perform at least the following:
determining a plurality of candidate data transmission slots, wherein each candidate data transmission slot has an index and said plurality of candidate data transmission slots are arranged in an order;
setting an index of a current candidate data transmission slot of the plurality to be an incremental increase of an index of a preceding candidate data transmission slot of the plurality in the event that a timing gap between a start of said current candidate data transmission slot and a start of a subsequent candidate data transmission slot of the plurality is greater than a threshold; and
setting the index of the current candidate data transmission slot to be equal to the index of the preceding candidate data transmission slot of the plurality in the event that the timing gap is not greater than said threshold.

13. The non-transitory computer storage medium as claimed in claim 12, wherein the computer-executable instructions, when executed by the at least one processor, further cause the at least one processor to perform the following:
setting an index of the subsequent candidate data transmission slot to be an incremental increase of the index of the current candidate data transmission slot of the plurality of candidate data transmission slots in the event that the timing gap is not greater than the threshold.

14. The non-transitory computer storage medium as claimed in claim 12, wherein the computer-executable instructions, when executed by the at least one processor, further cause the at least one processor to perform the following:
receiving and/or transmitting data over an air interface using at least one of the plurality of candidate data transmission slots.

15. The non-transitory computer storage medium as claimed in claim 12, wherein the computer-executable instructions, when executed by the at least one processor, further cause the at least one processor to perform the following:
receiving configuration data defining the threshold,
wherein the threshold is dependent, at least in part, on a latency requirement of data traffic towards a user device.

16. The method as claimed in claim 9, further comprising:
determining, for one or more of the plurality of candidate data transmission slots, whether the timing gap is greater than the threshold.

17. The method as claimed in claim 9, further comprising:
receiving configuration data defining the threshold,
wherein the threshold is dependent, at least in part, on a latency requirement of data traffic towards a user device.

18. The method as claimed in claim 9, further comprising:
transmitting data defining the plurality of candidate data transmission slots.

19. The method as claimed in claim 9, wherein the data defining the plurality of candidate data transmission slots comprises a time domain resource allocation table.

20. The method as claimed in claim 9, wherein the plurality of candidate data transmission slots are ordered based on starting symbols of the plurality of candidate data transmission slots.

* * * * *